Nov. 18, 1969     J. H. BAKER, JR     3,479,579
NUCLEAR MAGNETISM SIGNAL ANALYZING SYSTEM
Filed Dec. 6, 1966
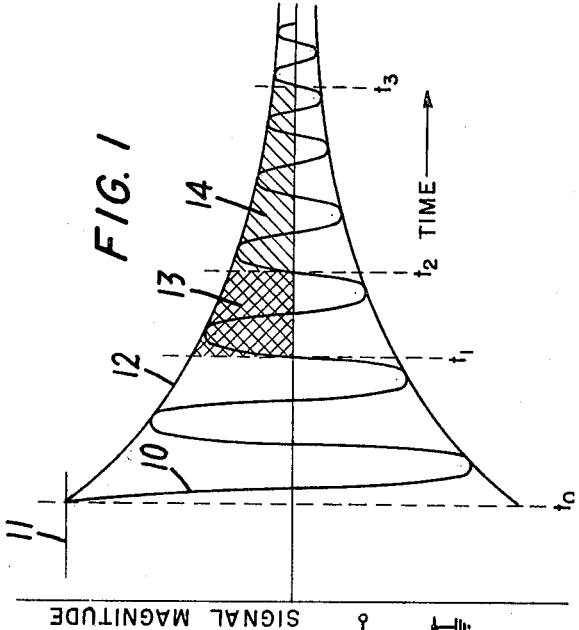
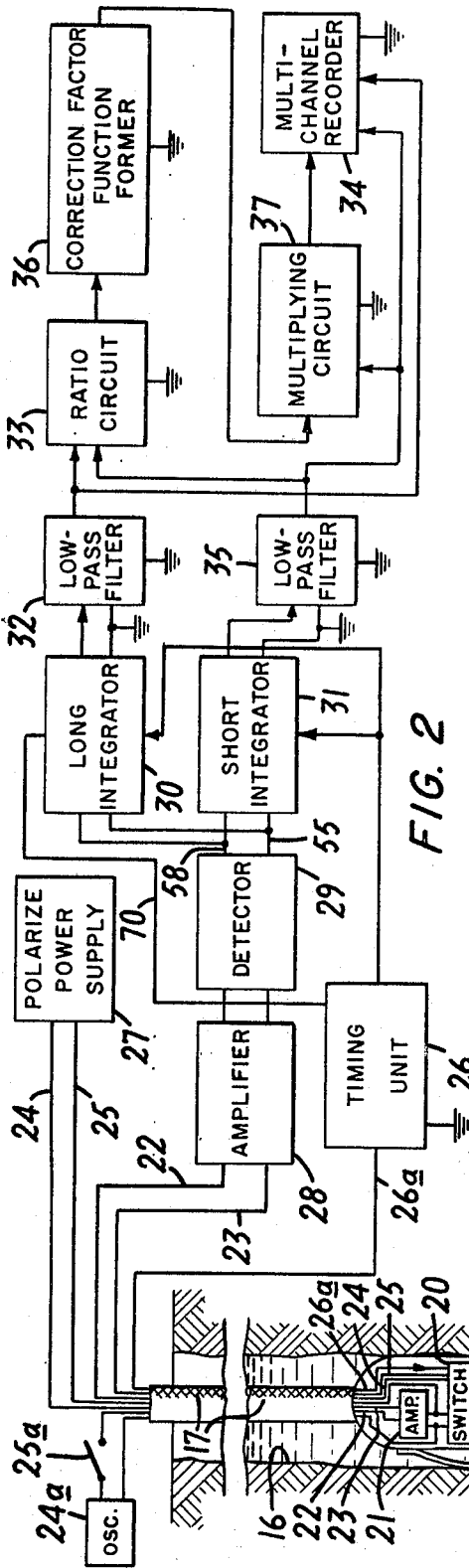
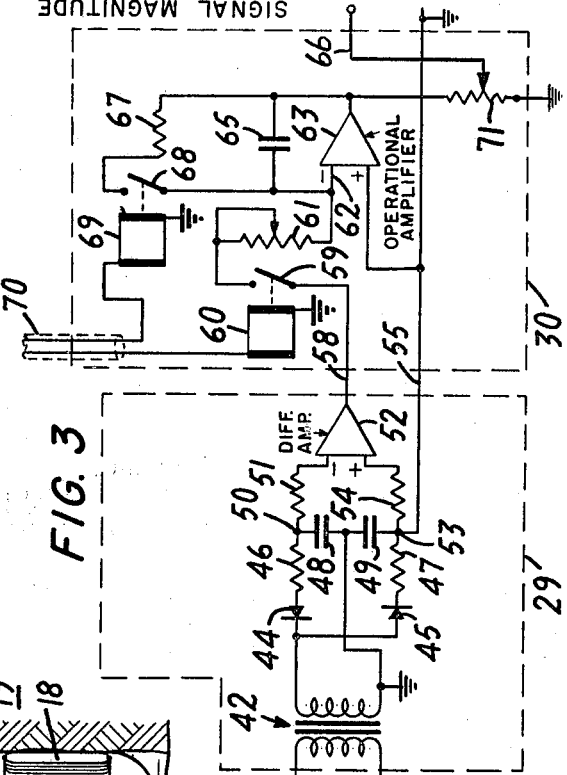
INVENTOR.
JOHN H. BAKER, JR.
BY Brumbaugh, Free,
Graves & Donohue
his ATTORNEYS

United States Patent Office 3,479,579
Patented Nov. 18, 1969

3,479,579
NUCLEAR MAGNETISM SIGNAL ANALYZING SYSTEM
John H. Baker, Jr., Houston, Tex., assignor to Schlumberger Technology Corporation, Houston, Tex., a corporation of Texas
Filed Dec. 6, 1966, Ser. No. 599,527
Int. Cl. G01n 27/72
U.S. Cl. 324—.5    8 Claims

ABSTRACT OF THE DISCLOSURE

In the particular embodiment of the invention described herein, an instrument disposed in a well bore has a coil positioned adjacent to the surrounding well formation. A control circuit first energizes the coil with polarizing field current and then connects the coil to two integrators which integrate a signal detected from the formation during a long period of time and a short period of time, respectively, to provide an indication of the signal decay rate.

---

This invention relates to nuclear magnetism well logging systems and, more particularly, to a new and improved system for analyzing nuclear magnetism signals.

In my copending application Ser. No. 537,475 filed Mar. 25, 1966, for "Nuclear Magnetism Logging System," an arrangement for inducing and detecting free precession of gyromagnetic nuclei in the formations adjacent to a well bore is described. As stated in that application, the determination of the initial magnitude of the precession signal which provides information regarding the proportion of free gyromagnetic nuclei in the formation is rendered difficult because the precession signal is extremely small, the duration of the measurable signal is very short and, during its initial operation, the signal is obliterated by transient signals resulting from termination of the polarizing field which is used to induce precession of the nuclei. In addition, according to the system described in the above-mentioned copending application, a ringing current is applied during the initial portion of the precession interval which also prevents detection of the precession signal during that time.

Accordingly, it is an object of the present invention to provide a new and improved system for analyzing nuclear magnetism signals which overcomes the above-mentioned disadvantages of present systems.

Another object of the invention is to provide a new and improved nuclear magnetism signal analyzing system which gives a highly accurate indication of the initial amplitude of a nuclear magnetism precession signal.

These and other objects of the invention are attained by integrating the direct current component of the nuclear magnetism signal over at least two selected periods of time following termination of interfering transient signals to produce accurate indications of the signal magnitude at known times after the initiation of the signal. The values obtained by this integration are compared as by taking their ratio so as to provide an indication of the initial magnitude of the signal which is, in turn, a measure of the proportion of free gyromagnetic nuclei, or "Free Fluid Index" of the formation. Preferably, the signal is integrated during two time periods which run concurrently, one period being longer than the other. Alternatively, the time periods may be consecutive or at spaced intervals.

In a particular form of apparatus according to the invention, a signal detector rectifies the nuclear magnetism signal and applies it to a long interval integrator and a short interval integrator. A ratio detector determines the ratio of the integrated signal magnitude during the two time intervals and this ratio is multiplied by a correction factor and by the short integrator signal to produce the free fluid index.

Further objects and advantages of the invention will be apparent from a reading of the following description in conjunction with the accompanying drawings, in which:

FIG. 1 is a graphical representation of the magnitude of a typical gyromagnetic precession signal indicating its variation with time;

FIG. 2 is a schematic block diagram illustrating a representative nuclear magnetism signal analyzing system according to the invention; and FIG. 3 is a schematic circuit diagram illustrating the arrangement of certain components of the system shown in FIG. 2.

In nuclear magnetism well logging operations, free gyromagnetic nuclei, such as protons contained in fluid material in the formation adjacent to a well bore, are polarized by a strong magnetic field so that their axes are aligned in a direction parallel to the field. Following termination of the polarizing field, the protons tend to precess in synchronism about axes parallel to a residual magnetic field of low strength which may be the earth's field. The synchronously precessing free protons can induce a detectable A.C. signal in a detecting coil in the well bore but the magnitude of the detected precession signal is reduced rapidly in accordance with the rate at which the protons are desynchronized or returned to random orientation as a result of thermal agitation. This effect is illustrated in FIG. 1 wherein the curve 10 represents the instantaneous magnitude of the A.C. signal induced in a coil by synchronously precessing protons, the precession being initiated at a time designated $t_0$. In the illustration of FIG. 1, the effects of transient signals are not shown but, for a considerable period of time after $t_0$, for example about 30–50 milliseconds, the detected proton precession signal 10 will be obliterated by other interfering signals of greater magnitude resulting from termination of the polarizing current. Consequently, it is not possible to determine directly the magnitude 11 of the precession signal 10 at the time of initiation.

In accordance with the invention, however, the decay curve 12 representing the rate of reduction of the magnitude of the signal 10 is determined by integrating the D.C. value of the signal after a time $t_1$ which is selected to avoid any interfering signals. In the example shown in FIG. 1, the D.C. value is integrated during a short interval 13 extending from $t_1$ to a time $t_2$ which may be about 20 milliseconds later and also during a longer interval 14 beginning at $t_1$ and ending at a time $t_3$ which may be as much as 100 milliseconds later. In this way, two values representing the magnitude of the signals at different times are obtained and each value is averaged over a time long enough to eliminate the effects of instantaneous fluctuations in the precession signal or interfering signals from other sources. The ratio of these values provides an accurate indication of the period of the decay curve 12 which, in turn, can be used to determine the initial magnitude 11 of the precession signal at the time $t_0$.

If desired, the two measurement intervals may be successive or even spaced rather than overlapping as shown in FIG. 1. In such cases, however, if the measurements are to be completed in the same total time so that the signal is not too small to be significant before the end of the last measurement, the duration of the measuring intervals will necessarily be shorter thereby reducing the averaging effect obtained by the longer interval measurements which tends to eliminate extraneous signal effects.

A representative arrangement for carrying out the invention is illustrated in FIG. 2 wherein an instrument 15 suspended in a well bore 16 by a multiconductor cable 17 includes a coil 18 arranged to generate a polarizing magnetic field in the formation 19 adjacent to the well bore and to respond to synchronous precession of the protons therein. Within the instrument 15, a switch unit 20 connects the two conductors from the coil 18 either to an amplifier 21 which is, in turn, connected to two conductors 22 and 23 of the cable 17 or to two further conductors 24 and 25 in the cable 17, the switch unit 20 being controlled by signals on another cable conductor 26a from a timing unit 26 at the surface of the earth.

To permit the coil 18 to be used for generating the polarizing field in the formation 19, the conductors 24 and 25 are connected at the surface of the earth to a polarize power supply 27 which provides the necessary current for the polarizing field to the coil 18 when the switch 20 connects those conductors to the coil. When the precession signal is to be detected, the switch 20 connects the coil 18 to the amplifier 21 within the instrument and the amplifier transmits the signals over the lines 22 and 23 to an amplifier 28 in which the signal is amplified in a conventional manner. From this amplifier, the signal is transmitted to a detector 29, described in detail hereinafter with reference to FIG. 3, wherein the D.C. component of the signal is obtained by full wave rectification.

Two integrators 30 and 31, which are also described in detail hereinafter, receive the D.C. signal from the detector and integrate it over a long period and a shorter period, respectively, under the control of the timing unit 26. The signal from the long interval integrator 30 is applied through a low pass filter 32, which holds the voltage output of long integrator 30 at a relatively constant value during the reset and next integration interval, to a ratio circuit 33 and also to a multichannel recorder 34. Similarly, the output from the short interval integrator 31 is connected through a low pass filter 35, which performs the same function as low pass filter 32, to both the ratio circuit 33 and the multichannel recorder 34, the ratio circuit 33 being arranged in a conventional manner to take the ratio of the two integrator signals. The ratio circuit output is applied to a correction factor function former 36 which produces a correction factor as described in detail below and the correction factor and the short integrator signal are both transmitted to a conventional multiplying circuit 37. This circuit produces a signal representing the product of the short integrator output and the correction factor and applies it to the recorder 34 as the Free Fluid Index of the formation.

The detector 29, as shown in FIG. 3, is a full wave rectifier and receives the precession signal through a transformer 42. One end of the secondary winding is connected through two oppositely oriented diode rectifiers 44 and 45 and corresponding series resistors 46 and 47 to two capacitors 48 and 49, the other sides of which are joined together to the other end of the secondary winding, which is grounded. The junction 50 between the resistor 46 and the capacitor 48 is, in turn, connected through a resistor 51 to one input of a difference amplifier 52 while the junction 53 between the resistor 47 and the capacitor 49 is connected through another resistor 54 to the other amplifier input and also to an output conductor 55 from the detector. The detector 29 could comprise any linear rectifier circuit, besides the specific detector circuit shown.

Inasmuch as both of the integrators 30 and 31 are identical in structure, the difference being in the duration of operation, only the integrator 30 is illustrated in detail in FIG. 3. Within this integrator, the conductor 58 is connected through a normally opened contact 59 of a relay 60 and an adjustable resistor 61 to one input of an operational amplifier 63, the conductor 55 being joined to the other input of the amplifier. A capacitor 65 is connected between the input 62 and an output conductor 66 from the amplifier and is shunted by a resistor 67 whenever a normally open relay contact 68 is closed by energization of a relay 69. Both of the relays 60 and 69 are actuated through a cable 70 from the timing unit 26. The output of the integrator which is supplied to the low pass filter may be adjusted by a variable resistor 71 connecting the line 66 to ground, the wiper arm of which is connected to the low pass filter 32, as the case may be. The output voltage of the short integrator 30 is $$e_0 = \int_{t_1}^{t_2} \frac{i}{c} dt = \frac{V_0}{RC} \int_{t_1}^{t_2} e^{-\alpha t} dt \qquad (1)$$

where $\alpha = 1/T_2$, $T_2$ being the time constant of the decaying precession signal, R and C are the integrator resistance 61 and the capacitance 65, and $V_0$ is the initial precession signal voltage shown as 11 in FIG. 1. The area under the signal envelope curve 12 between $t_1$ and $t_2$ is proportional to $T_2$. Thus, the area 13 (voltseconds) is $$A_{(t_2-t_1)} = e_0 RC = \int_{t_1}^{t_2} V_0 e^{-\alpha t} dt = \frac{V_0 e^{\alpha-t_1}}{\alpha}(1-e^{-\alpha t_g}) \qquad (2)$$

where $t_g = t_2 - t_1$ (the "gate time").

The voltage output of the short integrator (for a fixed gate time) is thus a function of the initial voltage and the decay rate of the signal. By the use of the two integrators 30 and 31 having different time gates of, for example, 20 and 100 milliseconds respectively, sufficient information is produced for precise determination of the Free Fluid Index (FFI) of the formation. Actually, any two times will work correctly so long as they are different and the interval of integration of the short integrator is long enough to provide an accurate value and the interval of integration of the long integrator does not extend so far as to be integrating noise only.

For convenience, a scaling factor relating to the overall system gain may be used that gives a "true" Free Fluid Index reading from the short integrator for a signal time constant of, for example, 70 ms. It is not convenient to generate a decaying signal with a precise time constant of 70 ms., so a continuous wave signal may be used for calibration. This signal is supplied from a suitable oscillator 24a at the surface which is connected through a single throw switch 25a to the input of amplifier 21. Or, if desired, the oscillator 24a could be downhole and D.C. power supplied to it for calibration. Also, the oscillator could be at the surface of the earth and the amplitude set in the instrument 15 by suitable means.

The basic reference for the system calibration may be, for example, the signal from a tank of water (100% FFI) with a "dry" 8-inch borehole. The apparatus may be calibrated by introducing a continuous wave signal of a "known" fraction of the "100% signal" at the input to amplifier 21. The signal area in the gate-time is larger for the continuous wave signal than for a decaying signal, but this area is not affected by the delay time before integration starts. With this system a calibrating factor is used that corrects for the "normalized" decay rate and the delay time. This factor is $$\frac{A_{(70\ ms.)}}{A_{(CW)}} = \frac{V_0 e^{-t_{1/70\ ms.}}(1-e^{-t_g/70\ ms.})}{V_0 t_g 1/70\ ms.} \qquad (3)$$

For the 20 ms. short integrator gate time, it is $$\frac{A_{(70\ ms.)}}{A_{(CW)}} = \frac{e^{-t_1/70\ ms.}(1-e^{-0.286})}{20\ ms./70\ ms.} = 0.870 e^{-t_1/70\ ms.} \qquad (4)$$

For the 100 ms. long integrator gate, it is $$\frac{A_{(70\ ms.)}}{A_{(CW)}} = \frac{e^{-t_1/70\ ms.}(1-e^{-1.43})}{100\ ms./70\ ms.} = 0.532 e^{-t_1/70\ ms.} \qquad (5)$$

These calibration factors are introduced into each integrator by adjusting the resistor 71, which reduces the effective gain of the integrator. For signal time constants of other than 70 ms., a correction must be made. The required correction factor is defined to be such that $$FFI_{(True)} = FFI_{(Short\ gate)} \times \text{Correction Factor} \qquad (6)$$

but the values obtained from the integrators are $$FFI = AK = \frac{V_0 e^{-\alpha t}}{\alpha}(1-e^{-t_g})K \tag{7}$$

where K is the scaling factor used to make the measured values from the long and short integrators equal to the true FFI for the selected or "normalized" time constant. When this time constant is 70 ms. and the short gate time is 20 ms., the short signal scaling factor is $$K_s = \frac{\alpha}{e^{-\alpha t}(1-e^{-\alpha t_{gs}})} \tag{8}$$

and the long ($t_g = 100$ ms.) factor is $$K_L = \frac{\alpha}{e^{\alpha-t}(1-e^{-\alpha t_{gL}})} \tag{9}$$

This gives $$C.F. = \frac{V_0}{A_{s(\text{norm})}} = \frac{\alpha}{e^{-\alpha t}(1-e^{-\alpha t_{gs}})} \cdot \frac{1}{K_s} \tag{10}$$

The ratio of the two measurements as determined by the circuit 33 and a simple departure curve introduced by the function former 36 provides a convenient method for determining the amount of correction required for one of the readings. The short-gate signal is used as the primary measurement because it changes less with changing signal time constant. The ratio is $$\frac{A_s}{A_L} = \frac{1-e^{-\alpha t_{gs}}}{1-e^{\alpha t_{gL}}} \cdot \frac{K_s}{K_L} \tag{11}$$

A departure curve is produced by plotting the Correction Factor vs. $A_s/A_L$ for selected values of the integration starting time ($t_1$) and the function former 36 is arranged in a conventional manner to produce an output in accordance with the departure curve.

In operation, the switch 20 is actuated to connect the polarize power supply 27 to the coil 18 in the instrument 15, producing a strong polarizing field which tends to align the axes of any free gyromagnetic nuclei, such as protons in water or oil, within the adjacent earth formation 19. After polarization, the polarizing field is terminated in any conventional manner or in the manner described in my above-mentioned copending application, so that the protons precess in synchronism about the earth's magnetic field and the timing unit 26 actuates the switch 20 to connect the coil 18 to the signal analyzing system through the conductors 22 and 23. The signal induced in the coil 18 by the precessing protons, amplified by the amplifiers 21 and 28, is applied to the detector 29 through the transformer 42. It will be understood, of course, that further amplification may be provided throughout the system, where necessary, and that other conventional techniques for handling nuclear magnetism signals, such as filtering to select only the precession frequency signal, may be used.

During each positive portion of the precession signal applied across the input resistor 43, as shown in FIG. 3, current is conducted through the diode 45 and the resistors 47 and 54 to the positive input of the amplifier 52 and, during each negative portion, current is applied through the diode 44 and the resistors 46 and 51 to the other input. As a result, a precession signal, similar to the curve 10 of FIG. 1, is converted to an output signal similar to the curve 12 of FIG. 1, the ripple being reduced to a minimum by the capacitors 48 and 49.

At the time $t_1$, the relay 60 in the long interval integrator 30 and the corresponding relay in the short interval integrator 31 are energized by the timing unit 26 and thereafter the capacitor 65 in each unit is charged at a rate proportional to the signal amplitude at the input 62 which is, in turn, dependent upon the setting of the resistor 61. At the time $t_2$, the relay 60 in the short interval integrator is de-energized and, at the time $t_3$, the long interval integrator relay opens so that, in each case, the charge on the capacitor is proportional to the corresponding area 13 or 14 under the curve 12 of FIG. 1. These signals applied through the output conductor 66 to the ratio circuit 33 provide an output from the ratio unit which when applied to the function generator 36, produce the proper correction factor to convert the short integrator output signal to a true FFI reading. After each measurement has been made, the relay 69 in both integrators is energized to discharge the capacitor 65 through the resistor 67 in preparation for the next measurement. The multichannel recorder 34 records the true FFI received from the multiplying circuit 37, and also records the signals received directly from the integrators 30 and 31.

I claim:

1. A method for nuclear magnetism well logging comprising the steps of producing a first decaying nuclear free precession electrical signal representative of materials surrounding a well bore, integrating said electrical signal over two non-identical time intervals during the decay of said first signal to produce second and third electrical signals proportional to the respective integrals, and taking a ratio of said second and third electrical signals to provide a fourth ratio signal which is representative of the decay rate of said first signal.

2. A method according to claim 1 including the step of extropolating the decay rate back to the time of initiation of the nuclear magnetism signals to determine the initial amplitude of the decaying signal.

3. A method according to claim 1 wherein the decaying signal is an alternating current signal and including the steps of rectifying the decaying signal prior to integration thereof.

4. A method according to claim 1 including the step of integrating the signal over two time intervals of different duration which start at the same time.

5. Apparatus for nuclear magnetism well logging comprising means for producing a decaying nuclear free precession electrical signal from materials surrounding a well bore, first and second signal integrator means for integrating said signal, timing means for rendering the integrator means operative during two non-identical selected time intervals during the decay of said free precession signal, and means for taking a ratio of the outputs of said two integrator means and for calculating therefrom the decay rate of said free precession signal.

6. Apparatus according to claim 5 wherein the timing means includes means for initiating operation of the two integrator means simultaneously and terminating operation of the integrator means at different times.

7. Apparatus according to claim 5 including detector means for rectifying an alternating signal to be analyzed and applying the rectified signal to the integrator means.

8. Apparatus according to claim 5 including correction means responsive to the means for determining the ratio for applying a correction factor to one of the integrator output signals.

References Cited
UNITED STATES PATENTS

| | | | |
|---|---|---|---|
| 2,888,638 | 5/1959 | Nelson | 324—0.5 |
| 3,128,425 | 4/1964 | Codrington | 324—0.5 |
| 3,275,931 | 9/1966 | Collins | 324—0.5 |

OTHER REFERENCES

Brown, R. J. S. and Gamson, B. W.: Nuclear Magnetism Logging, Journal of Petroleum Technology, August 1960, pp. 201–209.

RUDOLPH V. ROLINEC, Primary Examiner

MICHAEL J. LYNCH, Assistant Examiner

U.S. Cl. X.R.

235—183